April 16, 1968
F. TEMPLE
3,378,313
METHOD AND MEANS OF BRAKE CONTROL DURING CYCLING OPERATION
EMPLOYING PORTABLE BRAKE CYLINDER
PRESSURE RETAINING DEVICES
Filed Nov. 30, 1965
2 Sheets-Sheet 2
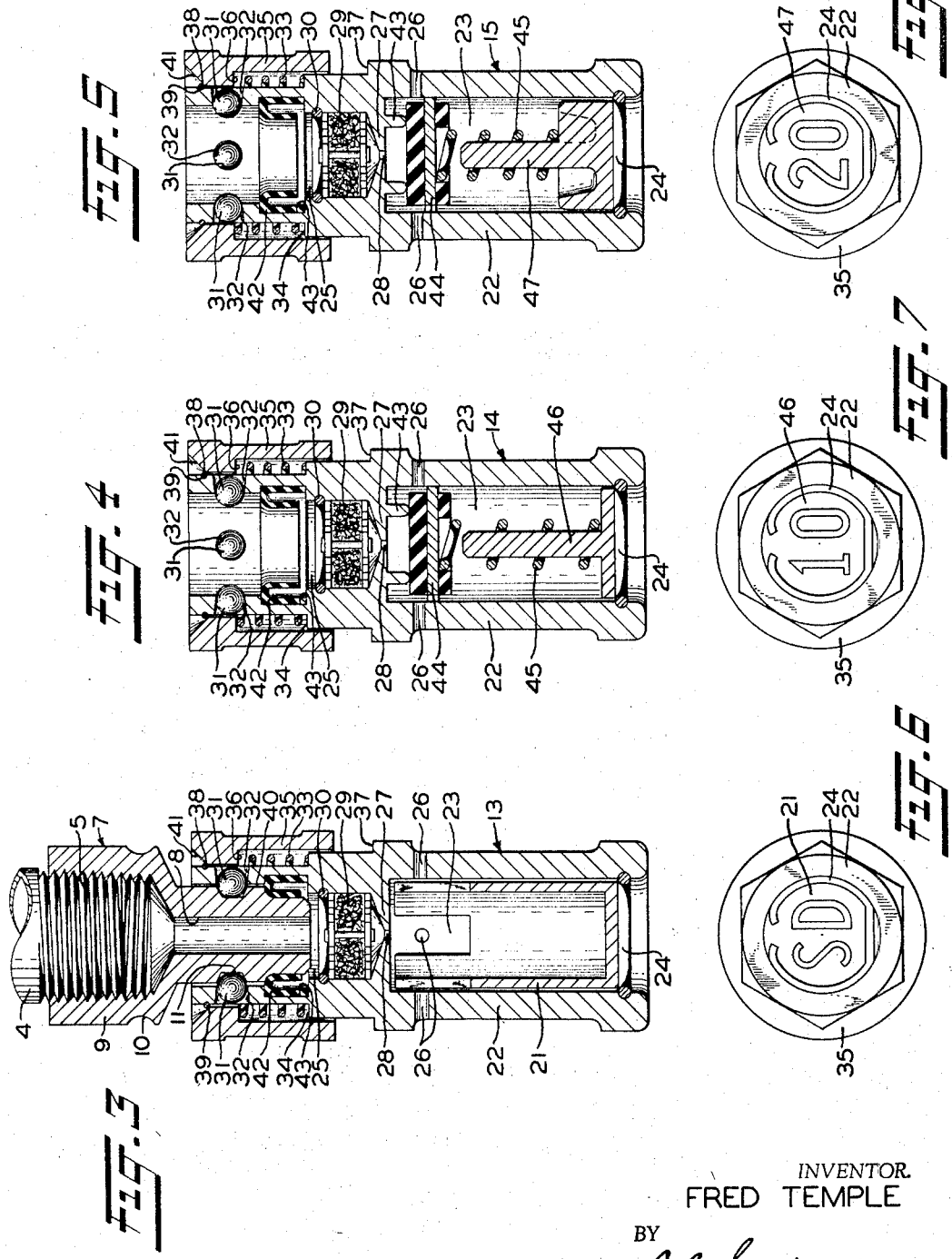
INVENTOR.
FRED TEMPLE
BY
*a. a. Steinmiller*
ATTORNEY

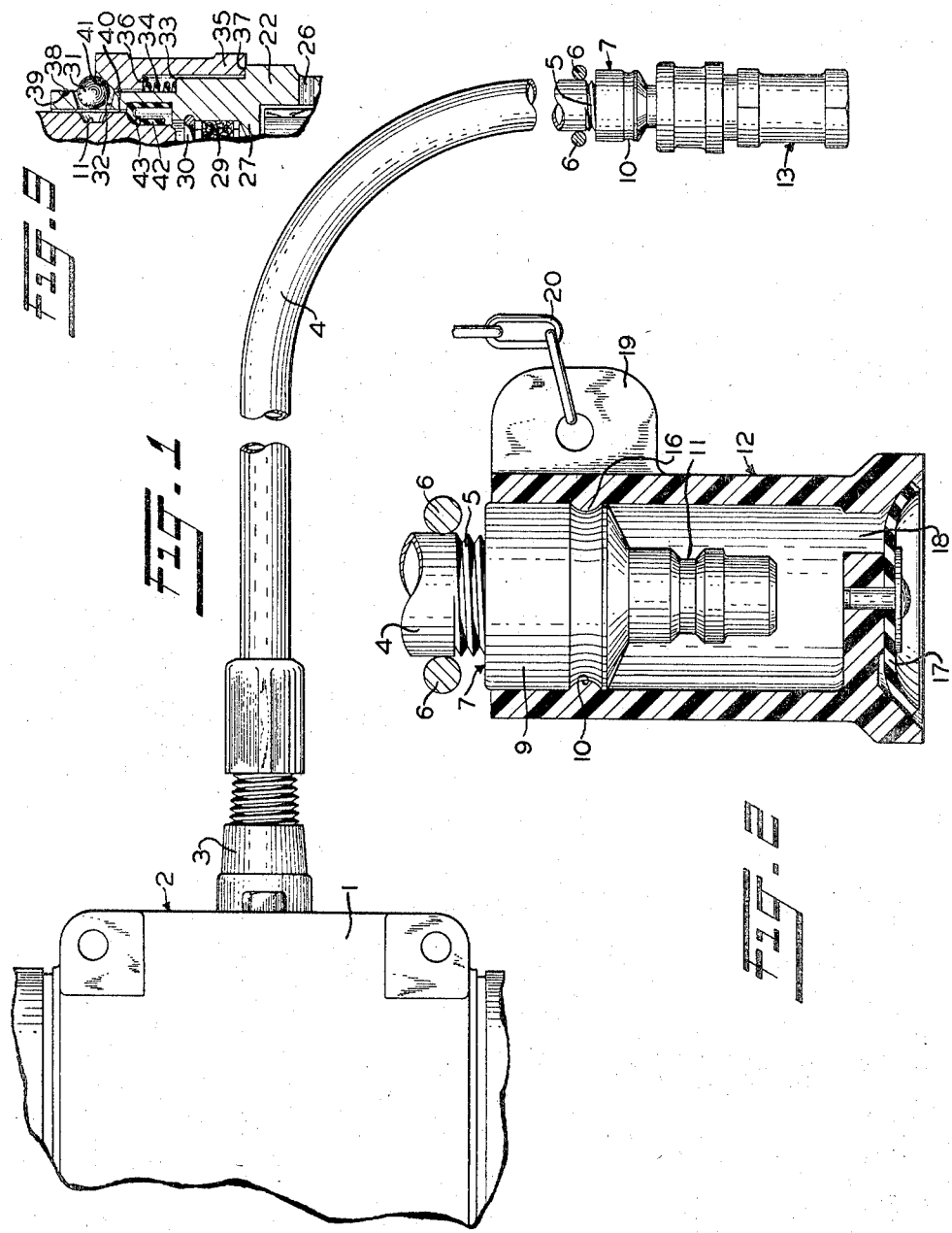

United States Patent Office 3,378,313
Patented Apr. 16, 1968

3,378,313
METHOD AND MEANS OF BRAKE CONTROL DURING CYCLING OPERATION EMPLOYING PORTABLE BRAKE CYLINDER PRESSURE RETAINING DEVICES
Fred Temple, Pittsburgh, Pa., assignor to Westinghouse Air Brake Company, Wilmerding, Pa., a corporation of Pennsylvania
Filed Nov. 30, 1965, Ser. No. 510,624
7 Claims. (Cl. 303—75)

ABSTRACT OF THE DISCLOSURE

A method and means of brake control during cycling operation of railway brakes whereby portable retaining valve devices which are preset for retaining the desired degree of brake cylinder pressure during such cycling operation and which are each provided with snap-on type latching means, may be rapidly installed on or removed from the end of a conduit extending from the release port of the brake control valve to an accessible location on the side of each car, by a crewman as the train slowly moves by a convenient point along the right-of-way.

---

It is well known to those skilled in the art that brake cylinder pressure retaining valves are used on freight cars for controlling release of brake cylinder pressure following a service brake application prior to descent of a steep grade during which a certain degree of brake application must be maintained for controlling the train. The brake cylinder pressure release port of the brake control valve of each car has a brake cylinder pressure retaining valve connected thereto whereby, according to the pre-setting of said retaining valve, brake cylinder pressure may be released at a slow controlled rate, or a predetermined degree of pressure, such as 10 p.s.i. or 20 p.s.i., may be retained in the brake cylinder, the pre-setting being determined by the length and degree of slope of the grade. According to the present arrangements, the brake cylinder pressure retaining valve on each car making up the train must be pre-set manually, just prior to descent of the grade, by a crewman climbing a ladder at the end of each car for operating the retainer valve handle which sets the retainer valve as desired. Thus, if it becomes necessary to cycle, that is, recharge the reservoirs on the cars of the train one or more times during descent by restoring the pressure in the brake pipe, the pressure retained in the brake cylinder on each car is effective to maintain a certain degree of braking during the interval of recharging of the reservoirs. At the end of the descent, the crewman must again climb to the top of each car to set the retaining valves for full release. The operating handle of the retaining valve is purposely located at the top of the car to minimize tampering therewith by unauthorized personnel.

Moreover, since many freight cars are used in interchange service, that is, transport of cars of one railroad over the right-of-way of another railroad, one or the other of which railroads may have steep grades over which the cars must travel, all such cars used in interchange service must be equipped with brake cylinder pressure retaining devices. Therefore, this requirement necessitates an added cost for equipping all cars with such permanently installed pressure retaining devices, although said pressure retaining devices are brought into operation only at such time that the cars are involved in descending steep grades.

The principal object of the present invention, therefore, is to provide a portable type brake cylinder pressure retaining device which can be readily snapped onto or removed from the end of a conduit or pipe, connected to the release port of the brake control valve on the car, by a crewman standing on the ground, thereby eliminating the necessity of the crewman having to climb up and down each car, and which pressure retaining devices could be stored in sufficient number at each locality where needed and made available to the crewman, thereby eliminating the necessity and cost of equipping each car with a pressure retaining device as well as eliminating the possibility of tampering therewith.

Briefly, the invention resides in connecting one end of a conduit or pipe to the release port of a brake control valve carried on a freight car with the other or open end thereof being disposed adjacent one side of the car so as to be readily accessible to a crewman from the ground level of the right-of-way. The invention further comprises the provision of a plurality of pressure release control or pressure retaining devices each being specifically designed for either permitting direct release of fluid pressure from the brake cylinder at a controlled predetermined slow rate or for maintaining a predetermined degree of fluid pressure in the brake cylinder such as 10 p.s.i. or 20 p.s.i., respectively, incident to cycling operation of the brakes, whereby a certain degree of braking is maintained during the interval of recharging of the reservoirs and the brake pipe during such cyling operation for effecting better control of the train during descent of a grade on the right-of-way. A protector member is also provided whereby the open end of the release conduit is covered to prevent introduction of foreign matter into said open end but at the same time permitting direct unrestricted release of brake cylinder pressure when a pressure retaining device is not in use. The protector member and each of the pressure retaining devices are designed to be readily snapped onto and off the open end of the release port conduit without any tools and with little effort.

In the drawings FIG. 1 shows a schematic arrangement of the invention as related to a brake control valve carried on a freight car; FIG. 2 is a sectional view, on a larger scale, of a direct release protector device snapped into place on the open end of a conduit connected to a brake cylinder pressure release port of the brake control valve shown in FIG. 1; FIG. 3 is a sectional view, on the same scale as FIG. 2, of a pressure retaining device of a certain rating; FIG. 4 is a sectional view, on the same scale as FIG. 2, of a retaining valve device of certain rating different than that of the device shown in FIG. 3; FIG. 5 is a sectional view, on the same scale as FIG. 2, of a retaining valve device of a certain rating different than those of the devices shown in FIGS. 3 and 4; FIGS. 6, 7 and 8 are bottom end views of the respective valve devices shown in FIGS. 3, 4 and 5; and FIG. 9 is a fragmentary sectional view of the valve device shown in FIG. 3.

Description and operation

In FIG. 1 of the drawings, a portion of a pipe bracket 1 of a brake control valve device 2 is shown with a brake cylinder pressure release or vent port 3, said brake control valve device being adapted for controlling operation of the brakes (not shown) on a railway vehicle (not shown), which for purposes of this invention will be considered to be a freight car though not necessarily limited thereto. Since a detailed description and operational understanding of the brake control valve device 2 is not essential to an understanding of the invention, it will suffice to state, with respect to said brake control valve device, that when the operator causes operation of the control valve device to effect a brake release, fluid pressure from the brake cylinder (not shown) is released to atmosphere via the vent port 3.

According to the invention, an extension conduit or pipe 4 has one end connected to the vent port 3 and extends from said vent port as to have a threaded end 5 opposite said one end conveniently disposed on one side of the car (not shown) and accessible from the ground level, said threaded end being anchored to the car by such means as a U-bolt or bracket 6, for example.

A tubular sleeve or male adapter 7 having a coaxial bore 8 extending therethrough (see FIG. 3) has an internally threaded end 9 by which said adapter is removably secured to the threaded end 5 of the extension conduit 4 for a purpose to be hereinafter disclosed. An external annular groove 10 encircles the threaded end 9 of the adapter 7, while an external annular groove 11 encircles a smaller diameter portion of said adapter, said grooves being provided for a purpose to be hereinafter disclosed.

The adapter 7, as may be seen in FIGS. 1 through 3, is provided to receive either a snap-on type combination vent protector and valve device 12 shown in FIG. 2 or one of several snap-on type pressure retaining devices 13, 14 and 15 shown in FIGS. 4 and 5, respectively.

The combination vent protector and valve device 12 is provided for protecting the adapter 7 and at the same time permits direct unrestricted venting of fluid pressure released from the brake cylinder (not shown) at such times that none of the pressure retaining devices 13, 14 or 15 is being used. The body of the vent protector 12 may be made of molded plastic material, for example, and is designed to be forced over the adapter 7 with a snap-on fit wherein an internal annular lip 16 formed therein at one end fits snugly into the groove 10 of said adapter for holding the protector in place. The other end of the vent protector 12 is provided with a flexible check valve 17 which covers a port 18 formed in said valve protector and which, due to its flexibility permits unrestricted direct venting of brake cylinder pressure to atmosphere via vent port 3, conduit 4, adapter 7 and said port 18. The check valve 18 also serves to exclude dirt and insects from the adapter 7 and the conduit 4 leading to the brake valve device 2, thereby preventing possible malfunctioning. The protector 12 may also be provided with a lug 19 formed integrally thereon and by which the protector may be secured by a chain 20 to the car body to prevent loss thereof when removed from the adapter 7 for installing one of the pressure retaining devices 13, 14 or 15.

The brake cylinder pressure retaining device 13 shown in FIG. 3 is in effect, a choke device designed to permit direct release of brake cylinder pressure, upon initiation of a brake release, but at a relatively restricted rate and is therefore known as a "slow direct" device. In order to identify the "slow direct" device 13, the letters SD may be stamped, cast, embossed or otherwise formed on an exposed area of a closure member 21 which is visible on the bottom of the device, as shown in FIG. 6.

The "slow direct" device 13 further comprises a generally cylindrical casing or body 22 having a coaxial cylindrical recess or chamber 23 at one end, in which the closure member 21 is loosely nested and secured therein by a lock ring 24, and a coaxial cylindrical recess or chamber 25 at the other end. The closure member 21 is in the form of a sleeve member closed at the one end (on which the letters SD appear) to thereby exclude dirt and insects from the device. The other end of the closure member 21 is open to permit fluid pressure released from the brake cylinder (not shown) via conduit 4 to escape to atmosphere via a plurality of openings or ports 26 formed in casing 22. Recess 23 is separated from recess 25 by an internal wall 27 formed in the casing 22. An orifice 28 of predetermined size is formed in the separating wall 27 to provide restricted communication between recess 23 and recess 25. A hair strainer or filtering member 29 is secured in the end of recess 25 adjacent orifice 28 by a lock ring 30 to prevent dust and dirt from flowing back into passageway 8 of the adapter 7.

The choke device 13 is provided with a well-known commercial type securing mechanism as seen in FIG. 6, by which the device is held securely on the adapter 7 when placed thereon, said securing mechanism comprising a plurality of balls 31 riding in respective tapered holes 32 angularly disposed about the upper end of casing 22. The taper of each hole 32 is of such angle and so directed as to permit the balls 31 disposed therein to protrude therefrom into groove 11 formed in the adapter 7, when the choke device 13 is in place on said adapter, but will not permit said balls to pass through the smaller diameter of the hole.

In assembling the securing mechanism of the choke device 13, the balls 31 are placed in the respective holes 32, then a spring 33 is slipped over the upper end of said valve device, with the lower end of said spring resting on an external shoulder 34 formed on the casing 22. A loosely fitting sleeve member 35 having an internal shoulder 36 formed therein is placed coaxially over the upper end of casing 22 to thereby trap the balls 31 in the holes 32 and cage the spring 33 between the shoulders 34 and 36. The sleeve member 35 is moved downwardly, as viewed in FIG. 3, to an unlatching position defined by abutment of the lower end of the sleeve member with an external shoulder 37 formed on casing 22 below shoulder 34 (see FIG. 9), whereupon a lock ring 38 is placed in an external annular groove 39 formed in casing 22 adjacent the upper extremity thereof. With lock ring 38 in place, the sleeve member may be released and will be biased upwardly by the spring 33, but is prevented from slipping off the end of casing 22 by abutment of the upper end of the inner periphery of said sleeve member with said lock ring, thereby limiting such upward movement of said sleeve member and defining a latching position thereof in which it is shown in FIG. 3.

To install the choke device 13 on the adapter 7, the sleeve member 35 is held in its unlatching position while the same end is slipped over the free end of said adapter which has a land 40 formed thereon below and adjacent the groove 11. As the sleeve member 35 and therefore the balls 31 pass over the land 40, said balls are forced out of the holes 32, when the sleeve member is in its unlatching position, into a space provided by an internal annular bevel 41 formed on the upper extremity of said sleeve member. See FIG. 9. The amount of movement permitted the sleeve member 35 between its latching and unlatching positions is predetermined so that when the sleeve member is in its unlatching position, the bevel 41 is positioned opposite the holes 32 to allow extrusion of the balls 31 out of the holes 32 and into the space provided by said bevel only to an extent necessary for said balls to clear the land 40 in passing thereover. Due to the relationship between the angle of taper of the holes 32 and the angle of bevel 41, when sleeve member 35 is in its unlatching position, sufficient restriction is provided to prevent the balls 31 from falling out of the valve device 13. Of course, when the balls 31 pass over the land 40, said balls will drop into the groove 11 of the adapter 7, whereupon the sleeve member 35 is released and allowed to be biased to its latching position, above defined and as shown in FIG. 3, in which said balls are locked by said sleeve member in said groove to keep the valve member 13 in place until removed.

A preformed sealing member 42, which may be made of a suitable material such as rubber, is removably disposed in an internal annular groove 43 formed in chamber 25 of casing 22 so as to snugly encircle the lower extremity of the adapter 7 when the choke device 13 is installed thereon, thereby insuring that fluid pressure released from the brake cylinder (not shown) during a brake release is vented, at the desired controlled rate, through the orifiice 28 and thence to atmosphere via the openings 26, rather than allowed to escape past the balls 31 and out to atmosphere between the loose-fitting sleeve member 35 and the casing 22.

To remove the choke device 13 from the adapter 7, the sleeve member 35 is manually moved by a pulling motion to its unlatching position, above defined, against the opposing force of springs 33, whereupon, with said sleeve member held in said unlatching position and continuation of said pulling motion, the choke device is pulled off said adapter. As occurs during installation of the choke device 13, the balls 31 ride up over land 40 and into the space provided by bevel 41 as the choke device is pulled off the adapter 7.

With certain exceptions, which will be set forth below, the retaining valve devices 14 and 15 shown in FIGS. 4 and 5, respectively, are generally similar in structure to the choke device 13 shown in FIG. 3, and, therefore, all structural elements which are common to the several devices have been assigned corresponding reference numerals.

The brake cylinder pressure retaining valve devices 14 and 15 differ from the choke device 13 in that the separating wall 27 in each of said valve devices 14 and 15 is provided, adjacent chamber 23 with an annular valve seat 43 surrounding orifice 28 and on which a loosely-guided spring-loaded valve member 44 disposed in chamber 23 is normally seated. In the valve device 14, as shown in FIG. 4, a spring 45 compressed between the valve member 44 and a spring seat member 46 urges said valve member toward a seated or closed position on the valve seat 43, said spring seat being retained in position by the lock ring 24 in a manner similar to that in which the closure member 21 is retained by the lock ring 24 in the choke device 13 (FIG. 3). The compression rating of spring 45 in valve device 14, as related to the area of valve member 44 included within the valve seat 43 when said valve member is seated thereon, is such as to require a pressure in excess of a predetermined degree, in this instance 10 p.s.i., for overcoming said spring and operating said valve member to an unseated or open position in which fluid pressure released from the brake cylinder via conduit 4 and orifice 28 may escape to atmosphere past the unseated valve member and openings 26. Thus when brake cylinder pressure is reduced as a result of a brake release via conduit 4 and orifice 28 in the valve device 14, spring 45 is effective for seating valve 44 on valve seat 43 when such brake cylinder pressure has reduced to 10 p.s.i. The retaining valve device 14 thus operates, when installed on the adapter 7, to insure that a minimum of 10 p.s.i. of brake cylinder pressure is retained during the recharging interval incident to cycling operation of the brakes, as above noted. Similarly to the closure member 21 of the choke device 13, as shown in FIG. 6, the valve device 14 has formed, in this case, the numeral "10" on the lower external surface of the spring seat member 46, as shown in FIG. 7, for purposes of identifying it as a 10 p.s.i. retaining valve.

Similarly to retaining valve device 14, the brake cylinder pressure retaining valve device 15, shown in FIG. 5 and as above noted, is also provided with the annular valve seat 43 and the valve member 44 urged toward a seated or closed position on said valve seat by the spring 45, which is compressed between said valve member and a spring seat member 47, which differs from spring seat member 46 in that the base thereof is axially thicker than the base of spring seat member 46. Due to the axially thicker base of spring seat member 47, spring 45 in the valve device 15 is compressed a greater amount than spring 45 in the valve device 14 and, therefore, maintained under greater compression than the spring in valve device 14. Thus, in the case of valve device 15, the spring seat member 47 is designed so as to compress spring 45 to a degree necessitating a fluid pressure in excess of 20 p.s.i. for unseating valve member 44 from valve seat 43. Otherwise the valve device 15 operates similarly to the valve device 14 and is identified by the numeral "20" appearing on the bottom external surface of the spring seat member 47, as shown in FIG. 8. If desired, the respective degrees of brake cylinder pressure retained by the valve devices 14 and 15 may be effected by providing springs of different strengths while maintaining identical spring seats in both valve devices.

It should be understood that any of the devices 13, 14 or 15 above described, can be designed to produce any desired results with respect to the rate at which brake cylinder pressure is dissipated (by choke device 13) or the minimum degree of brake cylinder pressure retained (by valves 14 and 15) by altering the dimension of the restricted orifice 28 or the compression of spring 45 accordingly.

In operation, therefore, when a train is moving over terrain which is void of any steep grades, there is no need for use of a brake cylinder pressure retaining device, and at such times the protector 12 should be installed over the adapter 7 to provide protection therefor and to permit direct unrestricted release of brake cylinder pressure when a brake release is effected.

If the terrain is generally hilly, that is, a rolling type of terrain constituting a series of grades which are not relatively steep or long, but which necessitates cycling operation of the brakes, that is, alternate braking and releasing for maintaining control of the train, on the downgrade surfaces of the terrain, then some degree of retention of brake cylinder pressure is desirable during the recharging interval of the reservoirs and brake pipe for minimizing jarring impacts and shocks resulting from train slack let-out and take-up caused by such cycling braking action. In case of a rolling type of terrain, the choke device 13, shown in FIG. 3 and identified as the SD device, would probably be best suited for use while the train is moving over such terrain. The SD device 13 allows brake cylinder pressure to vent directly from vent port 3 via conduit 4 and passageway 8 in the adapter 7, but at a restricted rate determined by the dimension of orifice 28. Thus, by retarding or restricting the rate at which brake cylinder pressure is released, enough brake cylinder pressure, though gradually reduced, is normally retained during the recharging interval to prevent complete let-out of train slack and keeps such slack gathered in to a certain degree for smoothing over the transition into the next braking cycle, if more than one cycle of braking action is deemed necessary in descent of the grade. Moreover, the SD choke device 13, though delaying complete release of the brake application for the purpose above set forth and in the manner described, assures complete release of brake cylinder pressure and of the brake application as the train moves up the ascending grades of the terrain. The SD devices 13, therefore, are installed at the point where the generally hilly terrain commences and are not removed until such terrain has been negotiated.

In a situation where the train must descend a relatively long steep grade of the order such as 5 to 10 miles, for example, either of the retaining valve devices 14 or 15 is used, depending on the length and severity of the grade. One crewman would stand on the right-of-way at one side of the train and another crewman would stand on the opposite side, both at a point along the right-of-way where the train would be moving slowly just prior to commencement of its descent of the grade. A crewman on each side of the passing train is necessary because the adapter 7 at the end of conduit 4 may be on one side or the other of each car, depending on the coupled disposition of each car in the train. As the train slowly moves by, the crewmen remove the protectors 12 and install the selected retaining valve devices 14 or 15, as the situation demands, on the adapters 7. With one or the other of the retaining valve devices 14 or 15 installed, the operator of the train is assured that there is always a minimum of 10 p.s.i. or 20 p.s.i. pressure in the brake cylinders during the recharging interval to maintain control of the train during its descent of the long steep grade. When the grade has been negotiated, the crewmen, suitably positioned at the foot of the grade, remove the retaining valve devices from the adapters 7 and restore the protectors 12 thereon as the train slowly moves by.

Having now described the invention, what I claim as new and desire to secure by Letters Patent is:

1. The method of controlling the brakes on a railway car during cycling which comprises:
    (a) providing a brake cylinder exhaust pipe which communicates with the exhaust port of a brake controlling valve device and which terminates on the side of railroad cars in a position accessible to a crewman standing at the ground level,
    (b) providing a supply of portable pressure retaining devices, and
    (c) installing the portable pressure retaining devices on the end of the brake cylinder exhaust pipe of each car as it moves past a predetermined point without stopping.

2. The method of claim 1 comprising the additional steps of:
    (a) removing the portable pressure retaining devices as the cars pass a second predetermined point without stopping, and
    (b) concurrently installing a portable check valve device on the end of the said pipe in lieu of the portable pressure retaining device.

3. Apparatus for controlling release of fluid pressure from a brake cylinder device of a railway car when effected by a brake control valve device during a brake release operation and through a vent port thereof, said apparatus comprising:
    (a) an extension conduit through which fluid pressure released from the brake cylinder device may be conducted, said extension conduit having one end connected to the vent port of the barke control valve device and the other end disposed at one side of the car in a position accessible to a crewman standing on the right-of-way, and
    (b) a pressure release control device installable and removable on said other end of said extension conduit by the crewman at preselected points of the right-of-way while the car moves therepast, said pressure release control device being characterized by:
        (i) latching means of the snap-on type for enabling rapid installation and removal of the pressure release control device, and
        (ii) pressure release means for effecting a predetermined release control of fluid pressure from the brake cylinder device during a brake release incidental to a cycling operation.

4. Apparatus, as defined in claim 3, wherein the pressure release means of said device comprises a check valve operable responsively to fluid pressure released from the brake cylinder device and prevailing in said extension conduit for effecting unrestricted venting of such fluid pressure to atmosphere, said check valve being effective, upon dissipation of such fluid pressure in said extension conduit, for closing said extension conduit from atmosphere.

5. Apparatus, as defined in claim 3, wherein the pressure release means of said device comprises a choke member for restricting venting of fluid pressure from said extension conduit, when released from the brake cylinder device, according to a rate determined by the flow capacity of said choke member.

6. Apparatus, as defined in claim 3, wherein the pressure release means of said device comprises normally closed valve means operable responsively to fluid pressure prevailing in said extension conduit, when released from the brake cylinder device and at a pressure in excess of a certain degree, to an open position in which said extension conduit is open to atmosphere and such fluid pressure therein is vented to atmosphere, said valve means being operative, upon reduction of fluid pressure in said extension conduit to said certain degree, to a closed position in which said extension conduit is closed to atmosphere and further venting of such fluid pressure to atmosphere is terminated.

7. Apparatus for controlling release of fluid pressure from a brake cylinder device of a railway car when effected by a brake control valve device during a brake release operation and through a vent port thereof, said apparatus comprising:
    (a) an extension conduit through which fluid pressure released from the brake cylinder device may be conducted, said extension conduit having one end connected to the vent port of the brake control valve device and the other end disposed at one side of the car in a position accessible to a crewman standing on the right-of-way, and
    (b) a pressure release control device installable and removable on said other end of said extension conduit by the crewman at preselected points of the right-of-way while the car moves therepast, said pressure release control device comprising:
        (i) a casing,
        (ii) quick disconnect means carried by said casing for securing the device on said other end of said extension conduit,
        (iii) a chamber in said casing and into which the other end of said extension conduit opens and out of which at least one port opens to atmosphere,
        (iv) a valve seat formed within the chamber of said casing,
        (v) a valve member having a closed position on said valve seat in which communication between said extension conduit and said port is closed, and
        (vi) a spring biasing said valve member toward its said closed position, the compression of said spring being such as to operate said valve member to its said closed position against the opposing force of fluid pressure prevailing in said extension conduit below a certain degree,
        (vii) said valve member being operable responsively to fluid pressure prevailing in said extension conduit, when released from the brake cylinder and at a pressure in excess of said certain degree, to an open position relative to said valve seat in which open position said communication between said extension conduit and said port is open.

References Cited

UNITED STATES PATENTS

| | | | |
|---|---|---|---|
| 1,895,479 | 1/1933 | McCune | 303—75 X |
| 2,661,017 | 12/1953 | Geiger | 137—269 X |

MILTON BUCHLER, *Primary Examiner.*

TRYGVE BLIX, *Examiner.*